Sept. 20, 1971   W. H. CLENDENIN ET AL   3,606,009
COTTON BOLL BOX CAPACITY INDICATOR Filed July 28, 1969   2 Sheets-Sheet 1

Inventors:
Wyatt T. Gable, Jr.
Wilbur H. Clendenin

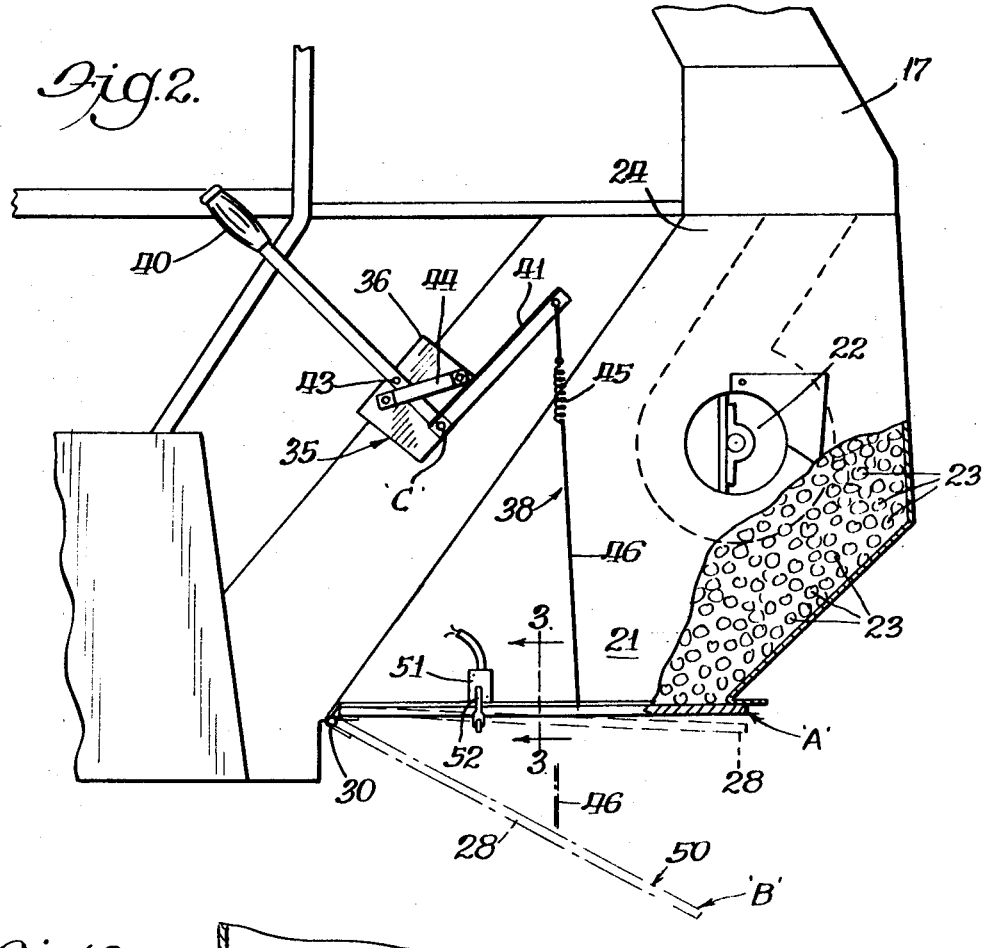
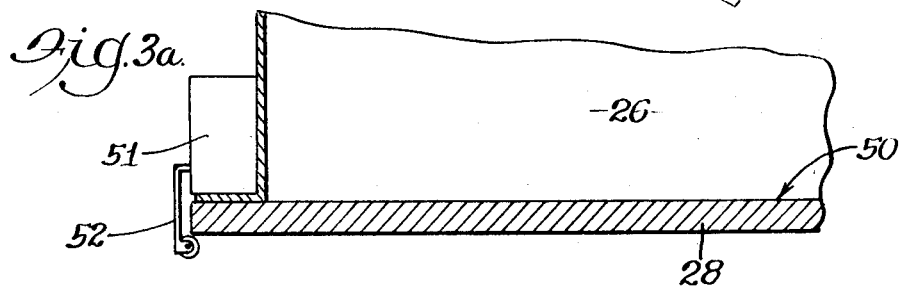
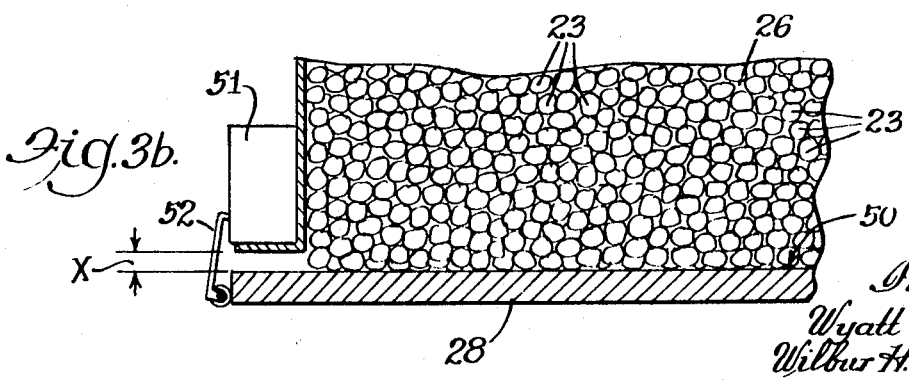

United States Patent Office 3,606,009
Patented Sept. 20, 1971

3,606,009
COTTON BOLL BOX CAPACITY INDICATOR
Wilbur H. Clendenin, Ava, Ill., and Wyatt T. Gable, Jr., Memphis, Tenn., assignors to International Harvester Company, Chicago, Ill.
Filed July 28, 1969, Ser. No. 845,368
Int. Cl. B07c 5/20
U.S. Cl. 209—71                5 Claims

ABSTRACT OF THE DISCLOSURE

An apparatus for signaling the operator of a cotton harvester that a predetermined quantum of green cotton bolls have been collected in a boll collecting chamber of the cotton harvester, the chamber having a hinged discharge door on which collected green bolls lie, the door being biased in a closed position by a resilient member arranged to provide a closing force to the door so that the door will assume a slight predetermined displacement toward the open position when the boll chamber is filled to capacity, an electric switch disposed to sense this displacement and thereupon to actuate closing an electric circuit which energizes a signaling device placed within sensorial range of the operator.

BACKGROUND OF THE INVENTION

In the harvesting of certain types of cotton, both the lint cotton and the still unripe green bolls are gathered in a single operation by a machine commonly known as a cotton stripper harvester. Harvesters of this type often incorporate a separating mechanism that segregate the lint cotton and the green bolls into separate receptacles during the harvesting operation in the field. The green bolls are then collected and subsequently dried for further processing.

One of the problems encountered during harvesting is that the receptacle in which the green bolls are collected is located remotely and not easily observed by the operator of the harvester; difficulty has been encountered in determining when the receptacle should be emptied. If the receptacle is allowed to over-load, the process that segregates the bolls from the lint cotton can be impaired by a back-up of the green bolls into the separating mechanism.

It is therefore desirable that a device capable of making a quantitative analysis of the amount of green bolls in the receptacle relative to its capacity be incorporated into the harvesting system in order that the operator can be made aware of the fact that the collecting receptacle has been filled to the desired amount.

A general object of this invention is to provide a green boll collection receptacle of a cotton harvester with a device for signaling the operator when a predetermined green boll quantum has been collected.

A more specific object of the invention is to provide the collection receptacle with a hinged discharge door yieldably biased in a closed position and disposed such that the collection of bolls within the receptacle urge a displacement of the door toward an open position, and a signaling device being operatively connected to the door for signaling the operator of a predetermined displacement which corresponds to a predicted boll quantum therein.

A specific object of the foregoing is to provide that the signaling device is actuated by an electric switch disposed to operate upon sensing that displacement of the door which corresponds to a predetermined quantum of bolls in the green boll receptacle.

BRIEF DESCRIPTION OF THE DRAWINGS

FIG. 2 is a fragmentary elevational view of the harvester-separator showing the boll collecting portion;
FIG. 3a is a fragmentary view taken substantially at line 3—3 of FIG. 2 showing the discharge door in a closed position;
FIG. 3b is a fragmentary view taken substantially at line 3—3 of FIG. 2 showing the discharge door in a displaced position.

DESCRIPTION OF THE PREFERRED EMBODIMENT

Figure 1:
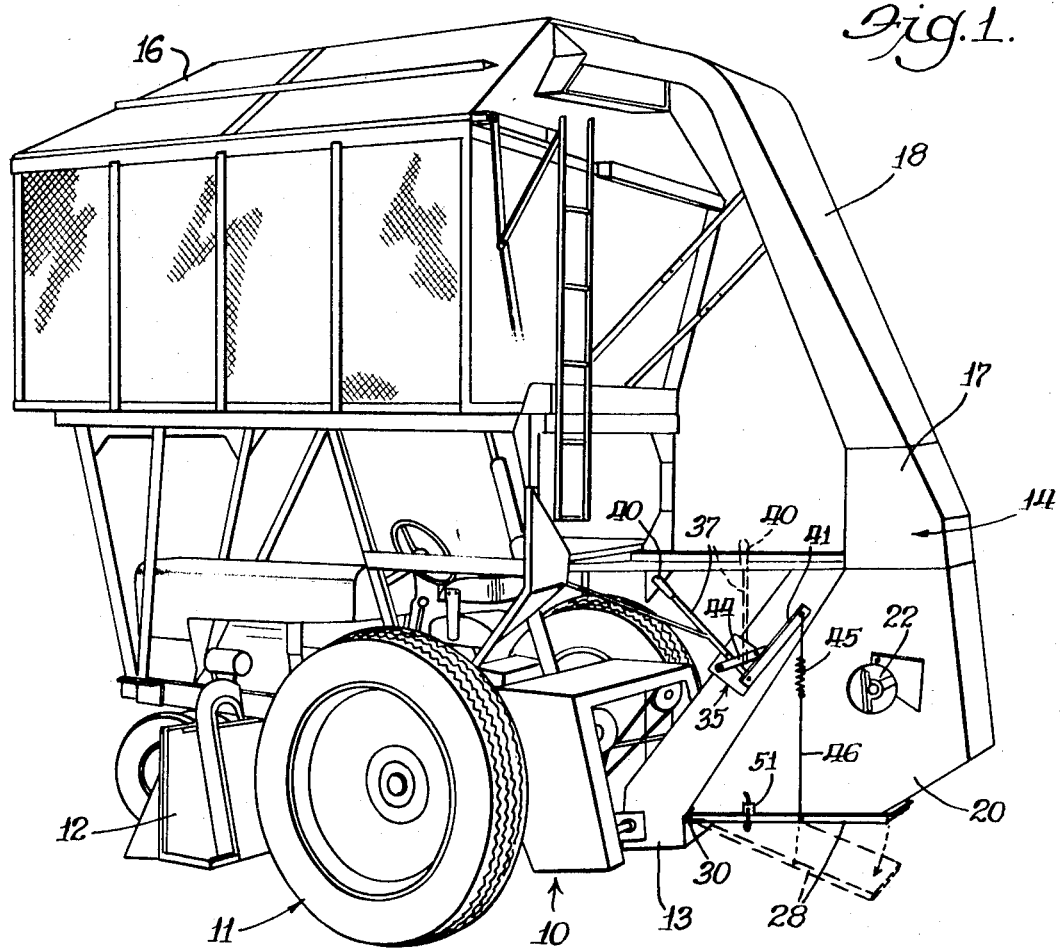
FIG. 1 is a perspective view of a cotton harvester separator with the present invention applied thereto.

Referring now in detail to the accompanying drawings, attention is directed first to FIG. 1 showing a cotton harvester-separator designated 10 on which the present invention has been adapted. The particular harvester illustrated is the type that is carried and powered by a conventional tractor 11.

The harvester-separator 10 comprises at least one stripping unit 12, an auger conveyor 13 and a separating portion 14. The stripping unit 12 is effective for stripping an aggregate of trash, lint cotton and unripened green bolls from the plant as a part of the harvesting operation. This aggregate is taken up by the auger conveyor which also serves to separate out some of the trash from the aggregate as it is delivered to the separating portion 14. The separating portion separates the green bolls from the remaining aggregate. During this process green bolls are segregated and collected while the lint cotton and remaining trash are conveyed into an accompanying basket 16.

The separating portion 14 comprises separating section 17, a discharge conduit 18, and a green boll collecting chamber 20 underposed in boll-receiving relation to the separating section 17.

Referring in detail to FIG. 2, the green boll collecting chamber 20 comprises an encompassing and generally vertically oriented wall structure 21 which merges with the separating section 17. A blower 22 is disposed in the upper portion of the collecting chamber and produces an air stream which induces separation of the green bolls from the remaining aggregrate. The segregated green bolls 23 drop through a passage 24 leading from the separating chamber 17 into a space 26 of the boll chamber 20 where they are collected.

The lower extent of the wall structure 21 terminates to define an opening 27 through which the collected green bolls are discharged from time to time as required. The opening 27 is covered by a discharge door 28 which is pivotally connected at one end to the wall structure 21 by a hinge 30, thus allowing the door to swing between a completely closed position indicated A and an open position indicated B.

The door is held in the closed position by a locking mechanism generally designated 35 which the operator can selectively release to permit the door 28 to swing downwardly into the open position B and discharge any green bolls collected within the chamber 20. The locking mechanism comprises a plate 36, a bellcrank 37 and linkage designated 38. The plate 36 is mounted on the wall structure 21 at a position above and slightly forward of the hinge 30 of the discharge door 28. The bellcrank 37 comprises a handle 40 and a reaction arm 41, and is pivotally mounted on the plate at point C. The handle has a pin 43 which protrudes from the handle toward the plate 36. The plate has a hole (not shown) which is disposed to register with the pin 43 when the handle is pulled to a position which corresponds to the discharge door being held in the closed position A by the linkage 38. A spring loaded element 44 acts to bias the handle 40 toward the plate 36 so that when this position is reached (corresponding to the closed position A of the door 28) the pin 43 is forced into the hole in the plate thus locking the bellcrank 37 in this position until the operator forces the handle 40 laterally and outwardly from the plate 36 such that the pin 43 is released from the hole and the bellcrank is allowed to pivot and permit the discharge door to swing downwardly toward the open position B. The linkage 37 comprises a tension spring 45 and a cable 46. The tension spring is connected at one end to the free end of the reaction arm 41 of the bellcrank. The other end of the spring is connected to cable 46 which in turn is connected to the discharge door 28. The linkage 38 is so arranged that when the door is in the completely closed position and bellcrank is in the locked position as heretofore described the spring 45 will be drawn and partially loaded to provide a constant upward force on the discharge door thereby biasing it in the closed position.

It can be seen that when the door 28 is in the closed position its upwardly facing surface 50 provides a platform on which the collected green bolls can accumulate; and it can be appreciated that as the boll collecting chamber fills, the collective weight of the bolls on the face 50 of the door 28 will produce a force counter to that of the tension spring 45. The tension spring 45 has been calibrated so that when the boll collecting chamber has been filled to a predetermined capacity the door will begin to overcome the closing force of the tension spring and a predictable displacement X toward the open position will be experienced. This is shown comparatively in FIGS. 3a and 3b.

Figure 4:
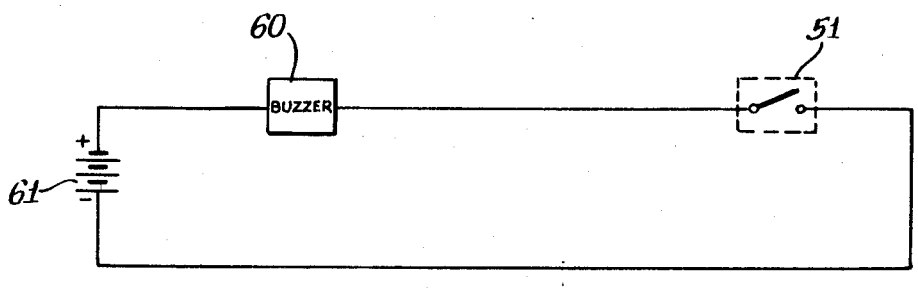
FIG. 4 is an electrical schematic diagram of the alarm circuit.

Since the displacement is indicia that boll capacity in the chamber 20 has been reached, an electrical switch 51 is utilized to sense this occurrence. The switch 51 is mounted on the wall structure 21 adjacent the discharge door 28 at a location close to hinge 30. The switch has an actuating arm 52 which is formed in such a manner that it will engage the door 28 in the displaced position and in so doing operate the switch 51 when the door 28 has been displaced the distance X toward the open position (see FIGS. 3a and 3b). When the switch is operated it energizes an alarm buzzer 60 which has been located near the operator. The entire circuit receives its power from the battery 61 of the tractor 11 as shown in the electrical schematic of FIG. 4.

It should be noted that as the boll box fills and the predictable displacement X of the door 28 occurs, the free end of the door will not open sufficiently to prematurely release any of the green bolls collected therein.

It is also contemplated that warning lamps could be used in conjunction with, or in lieu of the alarm buzzer.

While one embodiment of the present invention has been shown and described herein, it will be understood that various changes and modifications can be made therein without departing from the spirit of the invention.

What is claimed is:

1. In a mobile cotton harvester of the type that harvests an aggregate including lint cotton and green bolls, a separator for segregating the green bolls from the aggregate, a boll collecting receptacle disposed on said harvester in receiving relation to said separator, the receptacle including a discharge door hingedly mounted at one end thereto whereat said door being swingable to a closed position to restrain green bolls within the receptacle and to an open position which incurs discharge of the bolls therefrom, the improvement comprising: means for releasably securing the door in the closed position, said means including an operating element operable to swing said door to said positions, said securing means including a resilient member disposed between said element and said door, said member being effective to bias the discharge door in the closed position and yield to provide a predetermined displacement of the door toward the open position responsive to accumulation of a predictable quantum of bolls collected within the receptacle, signaling means mounted on said harvester and operative to signal the operator attendant to the attainment of said quantum, said means comprising an actuating member operable of said signaling means and being disposed adjacent said door and directly engageable therewith to thereby sense said displacement by movement thereof whereupon said signaling means is actuated.

2. The invention according to claim 1 and said boll collecting receptacle comprising a vertically oriented encompassing side wall structure terminating at the lower extent thereof in an opening defining a bottom portion of the receptacle, said discharge door swingably disposed in relation to said opening to provide the closed position, and said operating element comprising a handle operatively connected to said door for manually swinging the door to the closed position and to an open position to effect a slective discharge of bolls from the receptacle.

3. The invention according to claim 2 and said signaling means comprising an electrical circuit having an electrically actuated alarm connected in series with a set of electrical contacts which are arranged to close movement of said arm upon the occurrence of the predetermined displacement of said discharge door.

4. The invention according to claim 3 and said securing means comprising a bellcrank pivotally mounted on said harvester, a linkage connected between said bellcrank and said door to operate the door from the open to the closed position, and said resilient member operatively connected to said bellcrank and said linkage to bias the door in the closed position.

5. The invention according to claim 4 and said resilient member comprising a tension spring operatively connected between said bellcrank and said linkage, and said bellcrank having a lockable first position oriented relative to the closed position of the door to place the spring in tension to thereby provide a force to bias the door in the closed position.

References Cited

UNITED STATES PATENTS

| 1,868,727 | 7/1932 | Constable | 177—48 |
| 3,397,522 | 8/1968 | Sanderson et al. | 56—30 |

RICHARD A. SCHACHER, Primary Examiner

G. A. CHURCH, Assistant Examiner

U.S. Cl. X.R.

56—30